United States Patent [19]

Imashiro et al.

[11] Patent Number: 5,373,080
[45] Date of Patent: Dec. 13, 1994

[54] PROCESS FOR PRODUCING POLYCARBODIIMIDE RESIN

[75] Inventors: Yasuo Imashiro; Ikuo Takahashi, both of Tokyo, Japan

[73] Assignee: Nisshinbo Industries, inc., Tokyo, Japan

[21] Appl. No.: 101,309

[22] Filed: Aug. 3, 1993

[30] Foreign Application Priority Data

Aug. 10, 1992 [JP] Japan .................. 4-235331

[51] Int. Cl.$^5$ .................. C08G 18/02; C07C 267/00
[52] U.S. Cl. .................................. 528/67; 528/51; 528/69; 528/44; 564/252
[58] Field of Search .................. 528/51, 69, 67, 44; 564/252

[56] References Cited

U.S. PATENT DOCUMENTS

| | | | |
|---|---|---|---|
| 2,853,473 | 9/1958 | Campbell et al. | 528/51 |
| 2,941,966 | 6/1960 | Campbell | 528/51 |
| 2,941,983 | 6/1960 | Smeltz | 528/51 |
| 3,426,025 | 2/1969 | Smeltz | 528/51 |
| 3,640,966 | 2/1972 | Hennig et al. | 528/67 |
| 3,755,242 | 8/1973 | Reich | 528/51 |
| 3,907,780 | 9/1975 | Hughes | 528/51 |
| 3,929,733 | 12/1975 | Alberino et al. | 528/51 |
| 3,960,950 | 6/1976 | Hansen | 528/51 |
| 4,014,935 | 3/1977 | Ibbotson | 528/67 |
| 4,066,629 | 1/1978 | Edelman | 528/51 |
| 4,067,820 | 1/1978 | Wagner et al. | 528/51 |
| 4,088,665 | 5/1978 | Findeisen et al. | 528/51 |
| 4,105,642 | 8/1978 | Smith | 528/51 |
| 4,105,643 | 8/1978 | Smith | 528/51 |
| 4,148,844 | 4/1979 | von Bonin et al. | 528/67 |
| 4,284,730 | 8/1981 | Narayan et al. | 528/67 |
| 4,294,719 | 10/1981 | Wagner et al. | 528/67 |
| 4,344,855 | 8/1982 | Schäfer et al. | 528/51 |
| 4,487,964 | 12/1984 | Watson, Jr. et al. | 564/252 |
| 5,008,363 | 4/1991 | Mallon et al. | 564/252 |
| 5,100,994 | 3/1992 | Amano et al. | 528/44 |
| 5,246,993 | 9/1993 | Scherzer et al. | 528/51 |
| 5,264,518 | 11/1993 | Amano | 528/51 |

FOREIGN PATENT DOCUMENTS

| | | | |
|---|---|---|---|
| 651629 | 11/1962 | Canada | 528/51 |
| 548815 | 6/1983 | European Pat. Off. | |
| 2-202906 | 8/1990 | Japan | 528/51 |

OTHER PUBLICATIONS

Campbell et al; *Carbodiimides. IV. High Polymers Containing the Carbodiimide Repeat Unit;* vol. 28; Aug., 1963; pp. 2069-2075.

*Primary Examiner*—Morton Foelak
*Assistant Examiner*—Rabon Sergent
*Attorney, Agent, or Firm*—Adduci, Mastriani, Schaumberg & Schill

[57] ABSTRACT

The present invention provides a process for producing a polycarbodiimide resin from an aliphatic diisocyanate and a terminal-blocking agent in the presence of a carbodiimidization catalyst, wherein the aliphatic diisocyanate is tetramethylxylylene diisocyanate represented by the following formula

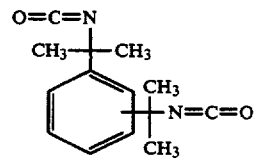

and polymerization is conducted using no solvent.

The polycarbodiimide resin obtained by the above process has good storage stability and excellent miscibility with organic solvents.

2 Claims, No Drawings

PROCESS FOR PRODUCING POLYCARBODIIMIDE RESIN

BACKGROUND OF THE INVENTION (1) Field of the Invention

The present invention relates to a process for producing a polycarbodiimide resin. More particularly, the present invention relates to a process for producing a polycarbodiimide resin having good storage stability and excellent miscibility with organic solvents.

(2) Description of the Prior Art

Polycarbodiimide resins having a structure of —N=C=N— in the molecule are known to have high heat resistance and other excellent properties and are in use in various fields as a thermosetting resin.

Polycarbodiimide resins have been produced in a reaction system using a solvent, except for few exceptional cases, because since the reactivity of carbodiimide group is high, carbodiimidization in high degree invites gelling due to the occurrence of side reactions. Consequently, the resulting polycarbodiimide resin has had limited applications owing to the solvent used.

For example, a polycarbodiimide resin produced using a high-boiling solvent finds no applications where a low-boiling solvent must be used.

The above polycarbodiimide resin may be used in said applications by conducting concentration to remove part or all of the high-boiling solvent and replace it with a low-boiling solvent. However, since the reactivity of carbodiimide group is so high as to invite gelling even in a solution, it is virtually very difficult to remove part or all of the high-boiling solvent.

Even if the above problem caused by the use of a solvent in polycarbodiimide production could be solved, problems still exist when the produced polycarbodiimide resin has low storage stability or poor miscibility with organic solvents.

SUMMARY OF THE INVENTION

The present invention has been brought about in order to eliminate the above drawbacks of the prior art and provide a process for producing a polycarbodiimide resin having good storage stability and excellent miscibility with organic solvents.

According to the present invention there is provided a process for producing a polycarbodiimide resin from an aliphatic diisocyanate and a terminal-blocking agent in the presence of a carbodiimidization catalyst, wherein the aliphatic diisocyanate is tetramethylxylylene diisocyanate represented by the following formula

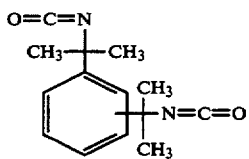

and polymerization is conducted using no solvent.

DETAILED DESCRIPTION OF THE INVENTION

The present invention is hereinafter described in detail.

The aliphatic diisocyanate used in the present invention is tetramethylxylylene diisocyanate represented by the above formula. More specifically, it is exemplified by p-tetramethylxylylene diisocyanate represented by the following formula

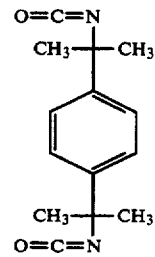

or m-tetramethylxylylene diisocyanate represented by the following formula.

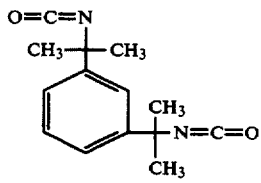

In the present invention, no other aliphatic diisocyanate can be used. That is, the first feature of the present invention lies in that a polycarbodiimide resin having good storage stability and excellent miscibility with organic solvents is produced by using tetramethylxylylene diisocyanate.

The terminal-blocking agent used in the present invention includes, for example, an aliphatic monoisocyanate. It can be exemplified by n-butyl isocyanate, tert-butyl isocyanate, isobutyl isocyanate, ethyl isocyanate, n-propyl isocyanate, isopropyl isocyanate, cyclohexyl isocyanate and n-octadecyl isocyanate. Of these, n-butyl isocyanate is particularly preferable.

In the present process, tetramethylxylylene diisocyanate and the terminal-blocking agent are subjected to a condensation reaction (wherein removal of carbon dioxide takes place) to produce a polycarbodiimide resin. The basic reaction is the same as in the conventional processes for polycarbodiimide resin production [U.S. Pat. No. 2,941,956; Japanese Patent Publication No. 33279/1972; J. Org. Chem., 28,2069–2075 (1963); Chemical Review 1981, vol. 81, No. 4, 619–621].

The condensation reaction between tetramethylxylylene diisocyanate and an aliphatic monoisocyanate as terminal-blocking agent (wherein removal of carbon dioxide takes place) proceeds in the presence of a carbodiimidization catalyst. As said catalyst, there can be used, for example, phospholeneoxides such as 1-phenyl-2-phospholene-1-oxide, 3- methyl-2-phospholene-1-oxide, 1-ethyl-3-methyl-2- phospholene1-oxide, 1-ethyl-2-phospholene1-oxide, 3methyl-1-phenyl-2-phospholene-1-oxide and 3-phospholene isomers thereof. 3-methyl-1-phenyl-2-phospholene-1-oxide is preferable in view of the reactivity.

As mentioned above, an organic solvent has ordinarily been used in the conventional processes for aliphatic polycarbodiimide resin production. In the condensation reaction of the present process, however, no solvent is used, and this is a second feature of the present invention.

The temperature of the above condensation reaction is in the range of preferably about 120° C. to about 250° C., more preferably about 150° C. to about 190° C.

The amount ratio of tetramethylxylylene diisocyanate to the aliphatic monoisocyanate (terminal-blocking agent) is preferably in the range of 2:1 to 2:30 (molar ratio). Consequently, the polymerization degree of the resulting polycarbodiimide resin becomes 1 to 30.

The reaction between tetramethylxylylene diisocyanate and the aliphatic monoisocyanate as terminal-blocking agent is conducted in an inert gas (e.g. nitrogen) current to complete the reaction quickly.

The polycarbodiimide resin obtained in the present process using no solvent is a viscous liquid resin and has no problem of limited applications seen in polycarbodiimide resins produced by the conventional processes using a solvent. Further, the polycarbodiimide resin obtained in the present process not only has very good storage stability but also is soluble in various organic solvents and can be used in various applications (e.g. crosslinking agent for aqueous resin) by selecting an appropriate solvent suitable for each application.

The present invention is hereinafter described in more detail by way of Examples.

EXAMPLE 1

244 g of m-tetramethylxylylene diisocyanate and 22 g of butyl isocyanate were reacted in the presence of 5.32 g of a carbodiimidization catalyst (3-methyl-1-phenyl-2-phospholene-1-oxide) in a nitrogen gas current at 180° C. for 66 hours to obtain a polycarbodiimide resin (polymerization degree=9). The resin had a stability of more than one month at room temperature, which was excellent.

The solubility of the polycarbodiimide resin in various organic solvents is shown in Table 1.

TABLE 1

| Solvent | Solubility |
| --- | --- |
| Benzene | Yes |
| Toluene | Yes |
| Xylene | Yes |
| Acetone | Yes |
| Methyl ethyl ketone | Yes |
| Ethyl acetate | Yes |
| Amyl acetate | Yes |
| Propylene glycol monomethyl ether acetate | Yes |
| Chloroform | Yes |
| Carbon tetrachloride | Yes |
| Methylene chloride | Yes |
| Trichloroethylene | Yes |
| Tetrachloroethylene | Yes |
| Dimethylformamide | Yes |

EXAMPLE 2

244 g of m-tetramethylxylylene diisocyanate and 22 g of butyl isocyanate were reacted in the presence of 5.32 g of a carbodiimidization catalyst (3-methyl-1-phenyl-2-phospholene-1-oxide) in a nitrogen gas current at 150° C. for 100 hours to obtain a polycarbodiimide resin (polymerization degree=9). The resin had a stability of more than one month at room temperature, which was excellent.

EXAMPLE 3

244 g of m-tetramethylxylylene diisocyanate and 22 g of butyl isocyanate were reacted in the presence of 5.32 g of a carbodiimidization catalyst (3-methyl-1-phenyl-2-phospholene-1-oxide) in a nitrogen gas current at 170° C. for 103 hours to obtain a polycarbodiimide resin (polymerization degree=9). The resin had a stability of more than one month at room temperature, which was excellent.

EXAMPLE 4

244 g of m-tetramethylxylylene diisocyanate and 22 g of butyl isocyanate were reacted in the presence of 5.32 g of a carbodiimidization catalyst (3-methyl-1-phenyl-2-phospholene-1-oxide) in a nitrogen gas current at 190° C. for 77 hours to obtain a polycarbodiimide resin (polymerization degree=9). The resin had a stability of more than one month at room temperature, which was excellent.

EXAMPLE 5

244 g of m-tetramethylxylylene diisocyanate and 66 g of butyl isocyanate were reacted in the presence of 6.2 g of a carbodiimidization catalyst (3-methyl-1-phenyl-2-phospholene-1-oxide) in a nitrogen gas current at 180° C. for 28 hours to obtain a polycarbodiimide resin (polymerization degree=3). The resin had a stability of more than one month at room temperature, which was excellent.

EXAMPLE 6

244 g of m-tetramethylxylylene diisocyanate and 10.4g of butyl isocyanate were reacted in the presence of 5.1 g of a carbodiimidization catalyst (3-methyl-1-phenyl-2-phospholene-1-oxide) in a nitrogen gas current at 180° C. for 126 hours to obtain a polycarbodiimide resin (polymerization degree=19). The resin had a stability of more than one month at room temperature, which was excellent.

EXAMPLE 7

244 g of m-tetramethylxylylene diisocyanate and 6.83g of butyl isocyanate were reacted in the presence of 5.0 g of a carbodiimidization catalyst (3-methyl-1-phenyl-2-phospholene-1-oxide) in a nitrogen gas current at 180° C. for 134 hours to obtain a polycarbodiimide resin (polymerization degree =29). The resin had a stability of more than one month at room temperature, which was excellent.

The polycarbodiimide resins obtained in Examples 2–7, similarly to the polycarbodiimide resin obtained in Example 1, were soluble in various organic solvents.

COMPARATIVE EXAMPLE 1

193.5 g of 4,4'-dicyclohexylmethane diisocyanate and 16.5 g of butyl isocyanate were reacted in the presence of 2.10 g of a carbodiimidization catalyst (3-methyl-1-phenyl2-phospholene-1-oxide) in a nitrogen gas current at 180° C. Gelling occurred in 10 hours and no polycarbodiimide resin was obtained.

COMPARATIVE EXAMPLE 2

181.6 g of isophorone diisocyanate and 18 g of butyl isocyanate were reacted in the presence of 2.0 g of a carbodiimidization catalyst (3-methyl-1-phenyl-2-phospholene-1-oxide) in a nitrogen gas current at 180° C. Gelling occurred in 3 hours and no polycarbodiimide resin was obtained.

What is claimed is:

1. A process for producing a polycarbodiimide resin comprising reacting a tetramethylxylylene diisocyanate represented by the following formula

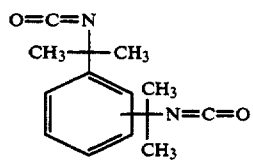

with an aliphatic monoisocyanate at a molar ratio of the tetramethylxylylene diisocyanate to the aliphatic monoisocyanate of 2:1 to 2:30 in the presence of a carbodiimidization catalyst selected from the group consisting of phospholeneoxides at a temperature in the range of about 120° C. to about 250° C. and in the absence of a solvent.

2. The process of claim 1, wherein the carbodiimidization catalyst is selected from the group consisting of 1-phenyl-2-phospholene-1-oxide, 3-methyl-2-phospholene-1-oxide, 1-ethyl-3-methyl-2-phospholene-1-oxide, 1-ethyl-2-phospholene-1-oxide, 3-methyl-1-phenyl-2-phospholene-1-oxide, and 3-phospholene isomers thereof.

* * * * *